United States Patent
Kothari et al.

(10) Patent No.: US 8,243,604 B2
(45) Date of Patent: Aug. 14, 2012

(54) FAST COMPUTATION OF ALTERATIVE PACKET ROUTES

(75) Inventors: Anurag Kothari, New Delhi (IN); Soumik Jana, Kolkuta (IN); Varun Chawla, New Delhi (IN)

(73) Assignee: Cisco Technology, Inc., San Jose, CA (US)

(*) Notice: Subject to any disclaimer, the term of this patent is extended or adjusted under 35 U.S.C. 154(b) by 300 days.

(21) Appl. No.: 12/074,505

(22) Filed: Mar. 3, 2008

(65) Prior Publication Data

US 2009/0046587 A1 Feb. 19, 2009

(30) Foreign Application Priority Data

Aug. 16, 2007 (IN) .......................... 1580/MUM/2007

(51) Int. Cl.
*H04J 1/16* (2006.01)
(52) U.S. Cl. ....................................... 370/238; 709/241
(58) Field of Classification Search .................. 370/238, 370/235, 254, 230.1, 237; 709/241
See application file for complete search history.

(56) References Cited

U.S. PATENT DOCUMENTS

| | | | |
|---|---|---|---|
| 5,754,543 A * | 5/1998 | Seid | 370/351 |
| 6,301,244 B1 * | 10/2001 | Huang et al. | 370/351 |
| 6,363,319 B1 * | 3/2002 | Hsu | 701/202 |
| 6,377,551 B1 * | 4/2002 | Luo et al. | 370/238 |
| 6,674,757 B1 * | 1/2004 | Zolfaghari | 370/395.31 |
| 6,744,727 B2 * | 6/2004 | Liu et al. | 370/228 |
| 6,762,997 B1 * | 7/2004 | Liu et al. | 370/238 |
| 6,812,925 B1 * | 11/2004 | Krishnan et al. | 345/423 |
| 7,130,262 B1 * | 10/2006 | Cortez et al. | 370/216 |
| 7,397,761 B2 * | 7/2008 | Kar et al. | 370/225 |
| 2003/0193898 A1 * | 10/2003 | Wong et al. | 370/252 |
| 2006/0002292 A1 * | 1/2006 | Chang et al. | 370/225 |
| 2006/0256768 A1 * | 11/2006 | Chan | 370/351 |

OTHER PUBLICATIONS

Light-Trial networks: Design and Survivability by Srivatsan et al publish in 2005.*
U.S. Appl. No. 11/879,845, filed Jul. 18, 2007.
A. Atlas, et al., Basic Specification for IP Fast-Reroute: Loop-free Alternates, Sep. 18, 2007.

* cited by examiner

*Primary Examiner* — Huy D Vu
*Assistant Examiner* — Dady Chery
(74) *Attorney, Agent, or Firm* — Baker Botts L.L.P.

(57) ABSTRACT

A method for communication includes simultaneously computing a shortest path and a backup path through a network between a pair of nodes. Packets are routed through the network using at least one path selected from among the shortest path and the backup path.

10 Claims, 5 Drawing Sheets

FAST COMPUTATION OF ALTERATIVE PACKET ROUTES

COPYRIGHT NOTICE

A portion of the disclosure of this patent document contains software code that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

A computer program listing appendix is submitted herewith on one compact disc and one duplicate compact disc. The total number of compact discs including duplicates is two. The files on the compact disc contains software pseudocode and output listings generated by operation of the pseudocode. The names, dates of creation, and sizes in bytes of the files are as follows: 62594 appendix1.txt, Feb. 12, 2008, 25 KB; 62594 appendix2.txt, Feb. 12, 2008, 36 KB.

FIELD OF THE INVENTION

The present invention relates generally to communication networks, and specifically to routing of packets in a computer network.

BACKGROUND OF THE INVENTION

Dijkstra's algorithm is a well-known greedy algorithm that solves the single-source shortest path problem for a directed graph with non-negative edge weights. For example, if the vertices (nodes) of the graph represent routers and networks, and edge weights represent links between pairs of routers or between routers and networks in a network, Dijkstra's algorithm can be used to find the shortest route between two points in the network. The well-known Open Shortest Path First (OSPF) routing protocol and Intermediate System to Intermediate System (ISIS) routing protocol, for example, use Dijkstra's algorithm in computing packet routes through Internet Protocol (IP) networks.

When a network link fails, the routers must typically compute new paths to replace those broken by the failed link. The IP Fast-Reroute (IPFRR) protocol has been proposed to reduce failure reaction time when this sort of local link failure occurs in an IP network. Atlas et al. provide a "Basic Specification for IP Fast-Reroute: Loop-free Alternates" in the document draft-ietf-rtgwg-ipfrr-spec-base-07 (Jul. 6, 2007), which is incorporated herein by reference. According to this document, IPFRR uses a pre-computed alternate next-hop in the event that the currently-selected primary next-hop fails, so that the alternate can be rapidly used to transmit packets when the failure is detected. A network with this feature is supposed to experience less traffic loss than a network without IPFRR. Atlas et al. describe an algorithm that may be used to perform the alternate next-hop computation.

BRIEF DESCRIPTION OF THE DRAWINGS

The present invention will be more fully understood from the following detailed description of the embodiments thereof, taken together with the drawings in which.

DESCRIPTION OF EXAMPLE EMBODIMENTS

Existing methods for IPFRR are computationally costly, since they typically require that for a given source node with n outgoing links, a next-hop calculation algorithm, such as Dijkstra's algorithm, be run n+1 times. Furthermore, these methods do not entirely resolve the problem of micro-looping between pairs or cycles of network nodes, which may occur when the network topology changes. These micro-loops may cause link congestion and/or packet loss.

Embodiments of the present invention provide methods of routing that use a novel search algorithm to find a backup path between a source node and each of a group of destination nodes simultaneously with finding the shortest path. The embodiments that are described herein below use a greedy shortest-path algorithm to find both the shortest path and the next-shortest path (which becomes the backup path for packet transmission) between a given source node and each of a set of destination nodes in a single pass of the algorithm over the nodes in the network. This algorithm bears a similarity to Dijkstra's algorithm, except that as the algorithm passes over the nodes, each path is evaluated as a candidate to be either the shortest path or the backup path (whereas Dijkstra's algorithm seeks only the shortest path). The methods that are described hereinbelow also eliminate from consideration backup paths on which looping (including micro-looping) may occur.

Figure 1:
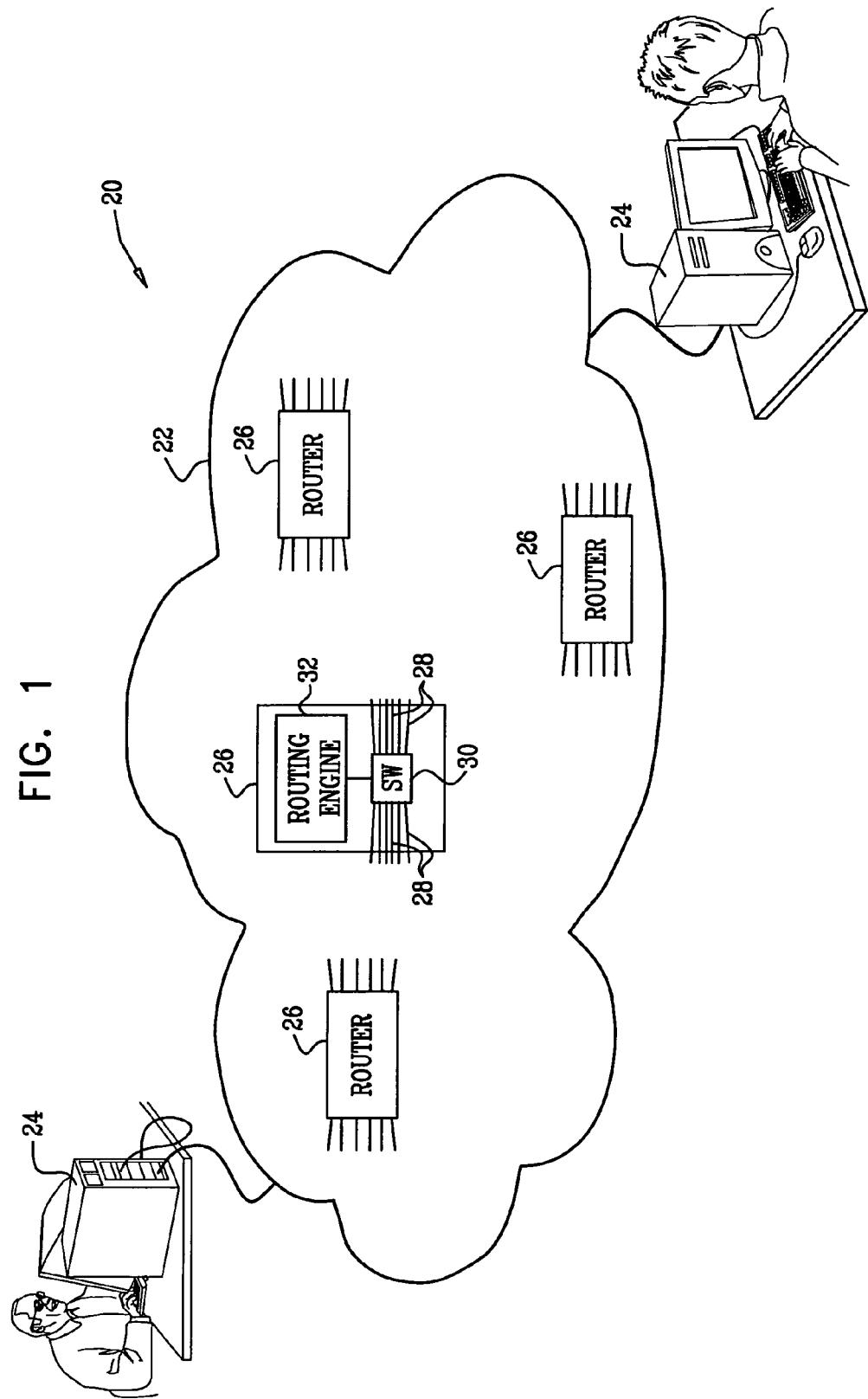
FIG. 1 is a block diagram that schematically illustrates a computer network in which routers compute paths in accordance with an embodiment of the present invention.

FIG. 1 is a block diagram that schematically illustrates a computer communication system 20 in which routers 26 compute paths in accordance with an embodiment of the present invention. A network 22, such as an IP network, carries packet communication traffic between computers 24. Traffic is conveyed through the network via routers 26, which comprise ports 28 that are interconnected via a packet switch 30. The switch passes packets from ingress to egress ports in accordance with routing instructions loaded by a routing engine 32. The routing engine typically comprises a general-purpose or specialized computer, which is programmed in software to perform the functions that are described hereinbelow. This software may be conveyed to the routing engine in electronic form, via network 22, for example, or it may be stored on tangible media, such as optical, magnetic or electronic memory media.

In each router 26, routing engine 32 computes routes from the router to various destination nodes in network 22. For this purpose, the routing engine receives and stores network topology information, identifying nodes in the network and links that connect the nodes, as well as the "cost" that is associated with each link for the purpose of routing computations. The cost is typically assigned by a system operator and may reflect the physical length of the link, as well as other bandwidth constraints and other routing considerations. The topology information may be distributed among the routers using any suitable protocol known in the art, but such protocols and methods are beyond the scope of the present invention.

Routing engine 32 simultaneously computes both the shortest path to each destination node and a backup path to that node, using the methods that are described in detail hereinbelow. The shortest path is "shortest" in the sense in which this term is commonly used in routing algorithms and protocols: the path that has the lowest cumulative cost from source to destination. The backup path typically has the next-lowest path cost. In the event of failure of a link on the shortest path to a given destination, the router immediately switches packet traffic to the backup path. Because the backup path is precomputed, the number of packets lost between the failure and switchover to the backup path is minimal. Furthermore, as the routing engine computes the paths, it checks each path for loops and potential micro-loops. Therefore, switchover to the backup path will not lead to loop and micro-loop formation.

Figure 2:
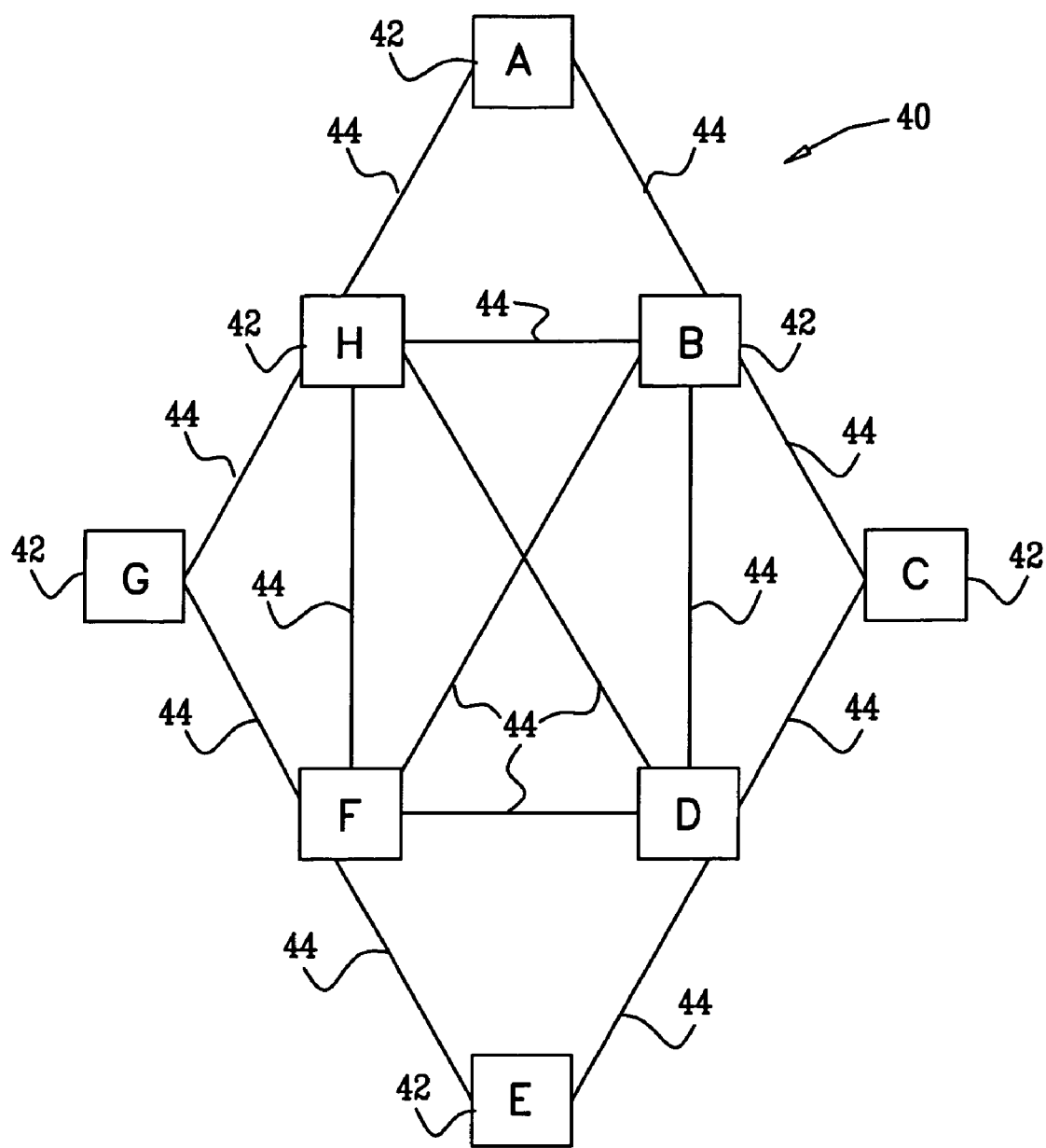
FIG. 2 is a graph that schematically represents a network in which shortest paths and backup paths are computed in accordance with an embodiment of the present invention.
Figure 3A:
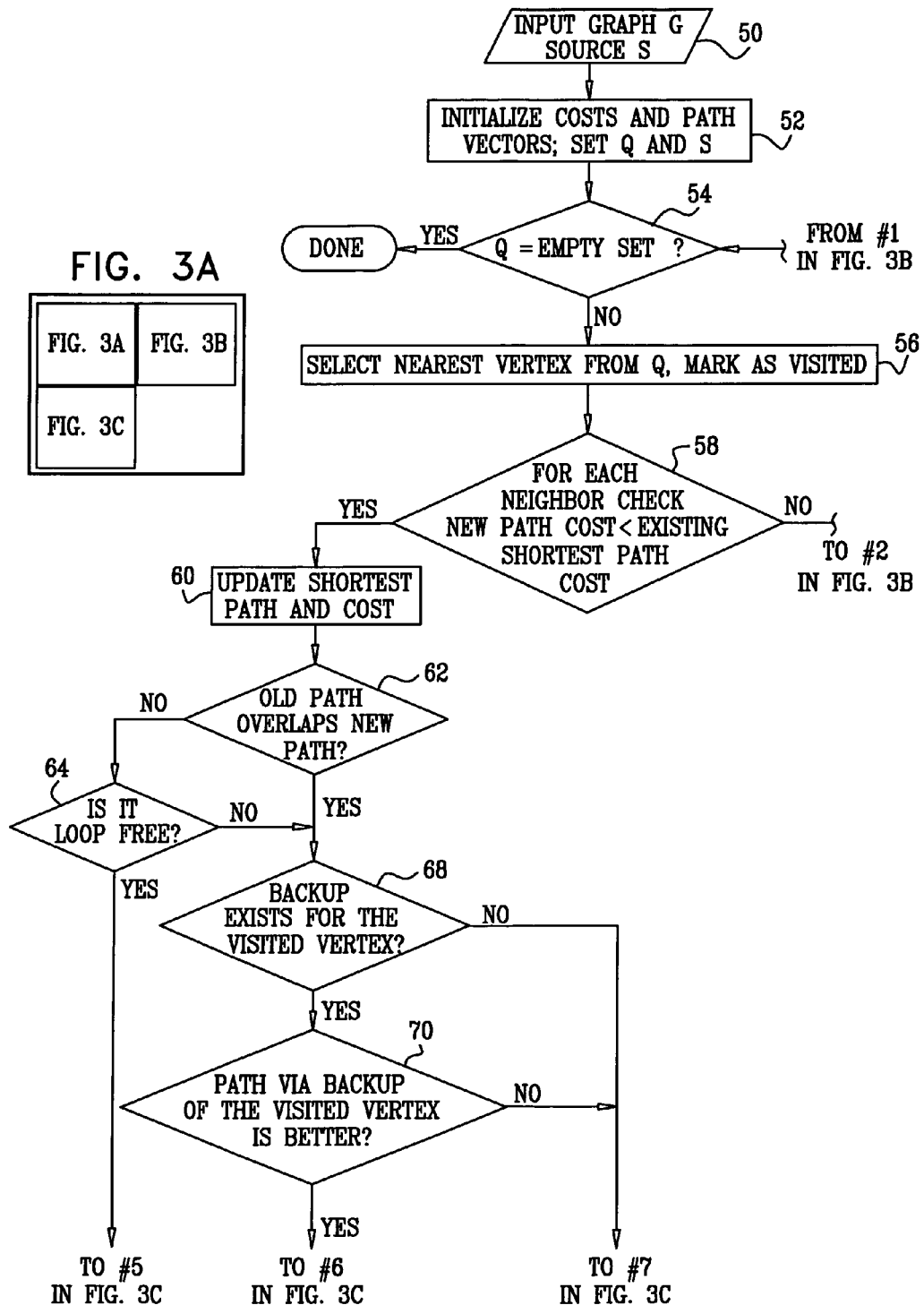
FIGS. 3A-3C are a flow chart, which schematically illustrates a method for path computation, in accordance with an embodiment of the present invention.
Figure 3B:
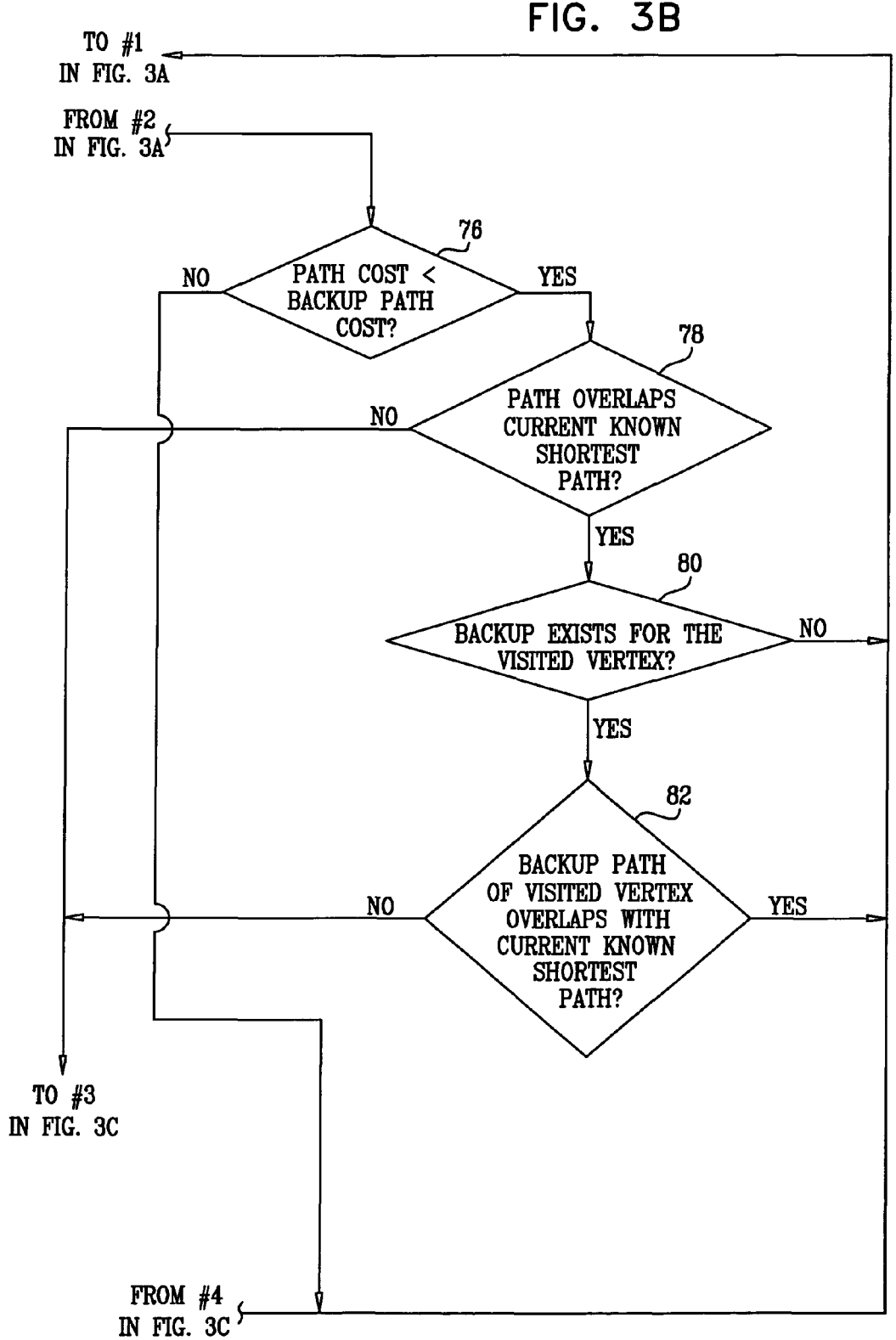
Figure 3C:
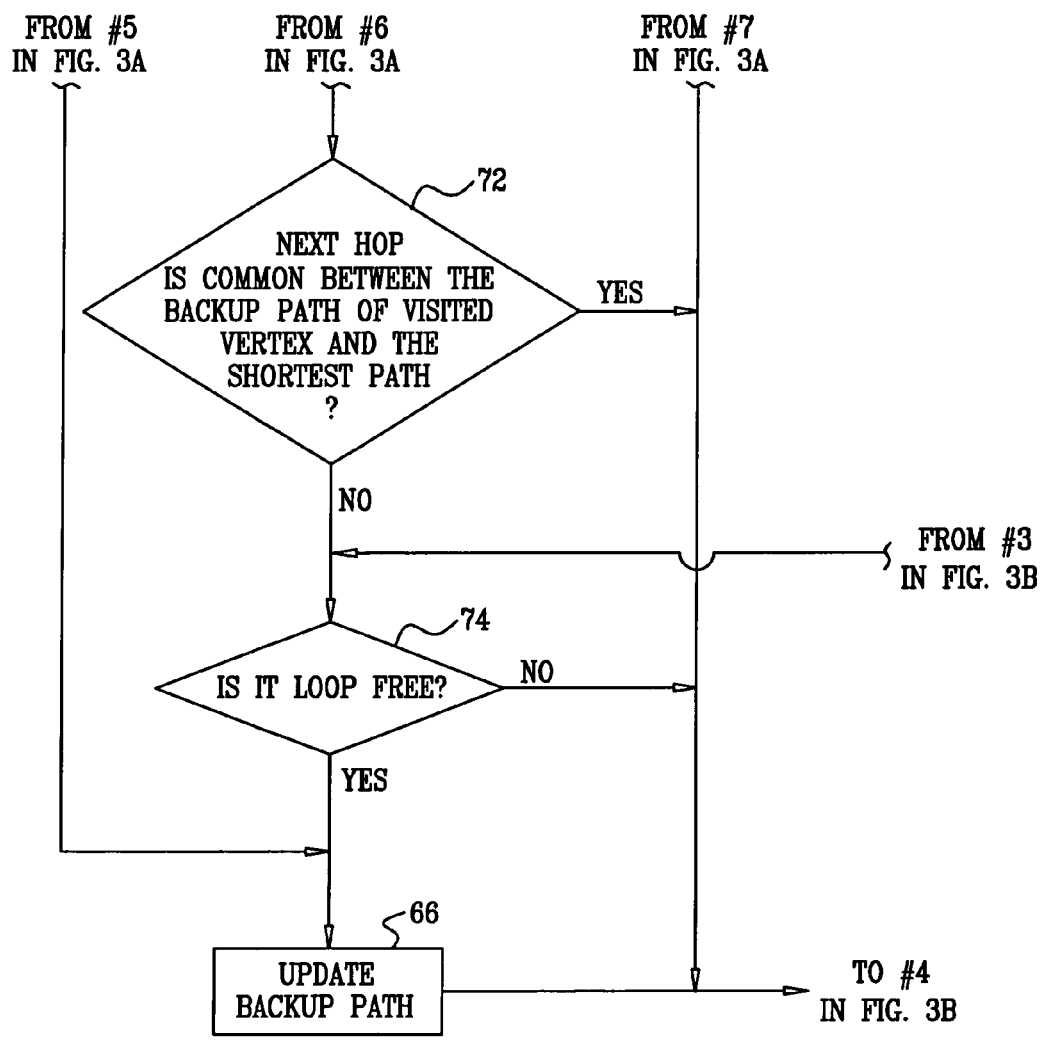

Reference is now made to FIGS. 2, 3A, 3B and 3C, which schematically illustrate a method for path computation, in accordance with an embodiment of the present invention. FIG. 2 is a graph illustrating a simple network 40, to which the method is applied by way of illustration. FIGS. 3A-3C are a flow chart that shows the steps in the method. One implementation of this method is shown below in Table I in pseudocode form, followed by annotations explaining the pseudocode in Table II. The attached computer program listing appendix contains an illustration of the values of the variables and the path computation results following each iteration of the algorithm. It also contains an alternative implementation of a path computation method, in accordance with another embodiment of the present invention, as well as an illustration of variable values and path computation for this alternative implementation.

As shown in FIG. 2, network 40 comprises nodes 42, labeled A through H, which are connected by links 44. It is assumed, for the sake of this example, that the links have the following costs:

| | Link: | | | | | | | | | | | | |
|---|---|---|---|---|---|---|---|---|---|---|---|---|---|
| | AB | BC | CD | DE | EF | FG | GH | AH | BH | BD | BF | DH | DF | FH |
| Cost: | 4 | 4 | 4 | 4 | 3 | 2 | 4 | 4 | 1 | 1 | 1 | 1 | 1 | 1 |

The distance from source to destination over a given path is equal to the sum of the costs of the individual links making up the path. This distance is also referred to as the path cost.

The method of FIGS. 3A-3C finds the shortest path and backup path from a given source node to each of the other nodes and records the results in a routing table. (In accordance with graph nomenclature, the nodes are also referred to as vertices, while the links are referred to as edges.) In this example, it will be assumed that A is the source node. In preparation for the search, routing engine 32 receives the graph G representing the network topology and the designation of the source node S, at an input step 50. The routing engine places all the vertices in a priority queue Q, and the path distances of the shortest path and backup path from the source node to all of the destination nodes in the routing table are initialized, with all values set to infinity (inf), at an initialization step 52. The routing engine checks the queue to make sure that it is not empty, at a queue checking step 54. When the queue is empty, the path computation terminates.

To begin the path computation, routing engine 32 chooses the nearest vertex from the priority queue, at a vertex selection step 56. "Nearest" (or equivalently, "best") in this case means the vertex at the shortest distance from the source. Therefore, node A, at distance zero from itself, is chosen first and is marked as "visited," i.e., it is removed from the queue.

The routing engine checks the path cost from the source node to each destination node that is reached by an outgoing edge from the currently-selected vertex, at a cost computation step 58. Thus, in the initial iteration in which node A is selected, the routing engine checks the path costs to nodes B and H. In the next iteration, in which node B is selected from the queue, the routing engine will check the path costs for paths ABD, ABF, ABH and ABA at step 58. (Path ABA, however, will be eliminated, however, since it contains a loop.)

The routing engine then checks the path cost to each destination node against the smallest path cost that is currently listed in the routing table. If the path cost computed at step 58 is less than the best path value in the table, the routing engine updates the best (shortest) path entry with the path vector and cost of the path that is under evaluation, at a best path update step 60. Before the initial iterations described above, the path costs in the table are all set to infinity, so that the path costs computed at step 58 will be smaller than the values in the record. Therefore, following the iterations through edges originating from nodes A and B, the routing table for node A will contain the following entries for all the destination nodes in network 40:

| | Destination: | | | | | | |
|---|---|---|---|---|---|---|---|
| | B | C | D | E | F | G | H |
| Best path: | AB | ABC | ABD | None | ABF | None | AH |
| Cost: | 4 | 8 | 5 | Inf | 5 | Inf | 4 |
| Backup path: | None | None | None | None | None | None | ABH |
| Cost: | Inf | Inf | Inf | Inf | Inf | Inf | 5 |

(The steps by which path ABH is entered in the routing table as the backup path are explained below.)

After updating the best path to a given destination at step 60, the routing engine checks whether the best path that was previously listed in the routing table (the "old path") overlaps with the new best path, at an overlap checking step 62. If so, the old path is not suitable for use as a backup to the new best path (since both could be broken by a single point of failure) and is therefore discarded. If the old path does not overlap the new path, the routing engine checks the old path to ensure that it is loop-free (including potential micro-loops that may occur in case of a link failure), at a loop checking step 64. Various techniques may be used for this purpose, such as the cost-based method listed in line 24 of Table I below. The routing engine discards the old path if it contains any such loops. If the old path is loop-free, the routing engine updates the backup path listed in the routing table with the old best path (which was displaced by a new best path at step 60), at a backup update step 66. If another backup path was listed previously, it is discarded.

If the old best path is found to overlap the new best path at step 62, or the old best path is found to contain a loop at step 64, the routing engine checks whether another backup path to the current destination node can be defined through the currently-selected vertex, at a backup checking step 68. For this purpose, the routing engine checks whether a backup path has already been recorded in the routing table between the source node and the currently-selected vertex. If not, and all the neighboring nodes of the currently-selected vertex have been checked, the routing engine goes back to step 54 to check the next vertex in the queue, until the queue is empty.

Otherwise, if there is an existing backup path from the source node to the currently-selected vertex, the routing engine extends this backup path to the current destination node, and checks the cost of this new backup path against the backup path cost that is currently listed in the routing table for the destination node in question, at a backup comparison step 70. If the cost of this extended backup path is greater than the backup path cost listed in the routing table, and all the neighboring nodes of the currently-selected vertex have been checked, the routing engine goes back to step 54 without changing the backup path listing. (Of course, if no backup path is yet listed in the routing table for the current destination node, the backup path cost will be listed as infinity, and the cost of the extended backup path will always be lower.)

If the cost of the extended backup path through the currently-selected vertex is lower than the backup path cost to the destination node in question that is currently listed in the routing table, the routing engine checks for overlap between the extended backup path and the new shortest path (found at step 60), at an overlap checking step 72. For this purpose, the routing engine checks whether the next hop of the backup path is part of the new shortest path. If not, the routing engine checks the extended backup path for loops, at a loop checking step 74. If the extended backup path passes the tests of steps 72 and 74, the routing engine records the extended backup path as the new backup path from the source node to the current destination node, at backup update step 66. If all the neighboring nodes of the currently-selected vertex have been checked, the routing engine then goes back to step 54 to choose the next vertex.

On the other hand, if the path cost computed at step 58 for a given new path to a destination node is not less than the best path value in the routing table, the routing engine checks whether this new path is satisfactory for use as a backup path, at a backup checking step 76. For this purpose, the routing engine compares the new path cost with the cost of the existing backup path to the current destination node. If the new path cost is lower, the routing engine checks whether this new path overlaps with the shortest path that is currently listed in the routing table for this destination node, at an overlap checking step 78. If not, and if the new path is loop-free, the routing engine records the new path in the routing table as the backup path for the current destination node, at backup update step 66.

Otherwise, if the new path is not suitable to be listed as the backup path, the routing engine checks whether a backup path to the current destination node can be defined through the currently-selected vertex, at a backup checking step 80. If such a backup path exists, the routing engine checks whether it is suitable for listing in the routing table (in terms of not overlapping with the shortest path), at a backup verification step 82. These steps are similar to steps 68 through 72, as explained above. The routing engine also checks whether the candidate backup path is loop free at step 74. If the new path passes all of these tests, the routing engine updates the routing table to list this backup path at step 66.

After checking all the neighbors of the currently-selected vertex, and updating the backup path as appropriate at step 66, the routing engine checks the status of the priority queue at step 54. As noted above, when there are no more vertices left in the queue, the method of FIGS. 3A-3C terminates. Otherwise, the routing engine proceeds to select the next vertex from the priority queue at step 56, and then iterates over the edges of network 40 that originate from this vertex as described above.

Thus, for example, in processing the outgoing edges of node F, the routing engine will determine at step 58 that the cost of path ABFG (7) is less than the cost of path AHG (8) and will substitute ABFG for AHG in the routing table at step 60. Since AHG is loop-free and does not overlap with ABFG, the routing engine lists AHG as the backup path for destination node G at step 66. Subsequently, however, the routing engine will substitute path AHFG for AHG as the backup path, since it has a lower cost (7) and overlaps the shortest path only in the final link (FG).

After all of the nodes in the queue have been removed and tested in order, the record of paths from node A to all the destination nodes in network 40 will contain the following entries:

|              | Destination: | | | | | | |
|---|---|---|---|---|---|---|---|
|              | B | C | D | E | F | G | H |
| Best path:   | AB | ABC | ABD | ABFE | ABF | ABFG | AH |
| Cost:        | 4 | 8 | 5 | 8 | 5 | 7 | 4 |
| Backup path: | AHB | AHDC | AHD | AHFE | AHF | AHFG | ABH |
| Cost         | 5 | 9 | 5 | 8 | 5 | 7 | 5 |

Thus, the method described above provides a shortest path and a backup path from the source node to each destination node simultaneously, in a single pass over the nodes in the network. The backup paths may be used, as explained above, in IPFRR and other methods of fast rerouting in case of failure of the shortest path. Because the shortest path and backup path do not overlap or form a loop, they may also be used simultaneously for purposes of load balancing, even if their costs are unequal. Although the method described above generates only a single backup path between a given source node and a given destination node, the method may be modified in a straightforward manner to provide multiple backup paths.

TABLE I

PSEUDOCODE LISTING

```
1   function Dijkstra(G, w, s)
2     for each vertex v in G
3       d[v] := infinity
4       P[v] := {s}
5       bd[v] := infinity
6       BP[v] := {s}
7
8     d[s] := 0
9     bd[s] :=0
10    S := empty set
11    Q := V[G]
12
13    while Q is not an empty set
14      u := Extract_Min(Q)
15      S := S union {u}
16      for each edge (u,v) outgoing from u
17        if d[u] + w(u,v) < d[v]
18          td := d[v]
19          d[v] := d[u] + w(u,v)
20          TP := P[v]
21          P[v] := P[u] union {v}
22          if TP intersection P[v] = {s,v}
23            n := Extract_Second_Element(TP)
24            if w(n,s) + d[v] > td − w(s,n)
25              bd[v] := td
26              BP[v] := TP
27          endif
```

TABLE I-continued

PSEUDOCODE LISTING

```
28         endif
29
30         if BP[u] != {s}
31            bd[u] + w(u,v) < bd[v]
32            n := Extract_Second_Element(P[v])
33            if BP[u] intersection {n} = {}
34               n := Extract_Second_Element(BP[u])
35               if w(n,s) + d[v] > bd[u] + w(u,v) − w(s,n)
36                  bd[v] := bd[u] + w(u,v)
37                  BP[v] := BP[u] union {v}
38               endif
39            endif
40         endif
41      endif
42   endif
43
44 else
45      if d[u] + w(u,v) < bd[v]
46         if P[u] intersection P[v] = {s}
47            n := Extract_Second_Element(P[u])
48            if w(n,s) + d[v] > d[u] + w(u,v) − w(s,n)
49               bd[v] := d[u] + w(u,v)
50               BP[v] := P[u] union {v}
51         endif
52      else
53         if BP[u] != {s}
54            if BP[u] intersection P[v] = {s}
55               n := Extract_Second_Element(BP[u])
56               if w(n,s) + d[v] > bd[u] + w(u,v) − w(s,n)
57                  bd[v] := bd[u] + w(u,v)
58                  BP[v] := BP[u] union {v}
59               endif
60            endif
61         endif
62      endif
63 endif
```

TABLE II

ANNOTATIONS TO PSEUDOCODE
The numbers of the annotations below are keyed to
the line numbers in the pseudocode listing above in Table I:

1. G = Graph, w = weight function, s = source
2. Initializations
3. Distance from source s to v
4. Path Vector from s to v
5. Backup distance from source s to v
6. Backup path vector from s to v
7.
8. Distance from s to s
9. Backup Distance from s to s
10. Set of all visited vertices
11. Set of all unvisited vertices
12.
13. The algorithm itself
14. Remove best vertex from priority queue (Choose closest as tie breaker)
15. Mark it 'visited'
16. Relax (u,v)
17. w(u,v) cost of path from u to v
18. Store d[v] in a temp variable.
19. Update shortest distance
20. Store P[v] in a temp variable
21. Add v to Set of nodes in path
22. Check Newpath does not overlap old path
23. Extract the Nexthop from the Path
24. Check if the path is loop free.
25. Update backup distance
26. Update backup path
27.
28.
29.
30. Check if backup path for u exists.
31. Check if it provides a better alternative

TABLE II-continued

ANNOTATIONS TO PSEUDOCODE
The numbers of the annotations below are keyed to
the line numbers in the pseudocode listing above in Table I:

32. Extract the Nexthop from the path
33. Check if Nexthop is common
34. Extract the Nexthop from the backup path
35. Check if the path is loop free
36. Update backup distance
37. Update backup path
38.
39.
40.
41.
42.
43.
44.
45. Check for better backup distance
46. Check candidate backup path does not overlap current known shortest path
47. Extract the Nexthop from the Path
48. Check if the path is loop free.
49. Update backup distance
50. Update backup path
51.
52.
53. Check if u has backup path
54. Check backup path of u does not overlap the current known shortest path
55. Extract the Nexthop from the path
56. Check if the path is loop free
57. Update backup distance
58. Update backup path Although embodiments of the present invention are described above in the specific context of packet routing in communication networks, the principles of the present invention may similarly be applied in other applications in which paths through a graph are computed. For example, the methods described above may be used, *mutatis mutandis*, for route finding in navigation applications.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method comprising:
simultaneously computing a shortest path and backup path through a network between a source node and a destination node, the network having a plurality of nodes, in a single pass of a greedy search algorithm over the nodes of the network, wherein:
computing the shortest path and the backup path comprises:
computing respective path costs for each of a plurality of candidate paths between the source node and the destination node based on respective link costs of one or more links within each candidate path;
selecting as the shortest paths the candidate path having a lowest computed path cost;
selecting as the backup path the candidate path having a lowest computed path cost of the candidate paths that does not overlap with the shortest path, including comparing a potential backup path to the shortest path and determining that the potential backup path overlaps with the shortest path, and in response, discarding the potential backup path as a possible backup path;

verifying that the backup paths are loop-free and will not lead to a micro-loop in response to a failure of a link in the network; and routing packets through the network using at least one path selected from among the shortest paths and the backup paths.

2. The method according to claim 1, wherein respective link costs are assigned to links connecting the nodes in the network, and wherein finding the shortest paths and the backup paths comprises, in the single pass over the destination nodes:

identifying multiple paths between the source node and each of the destination nodes, each path comprising one or more of the links;

computing respective path costs for the multiple paths based on the respective link costs of the one or more of the links comprised in each path; and choosing two of the paths between the source node and each of the destination nodes as the shortest path and the backup path responsively to the respective path costs.

3. The method according to claim 2, wherein routing the packets comprises transmitting the packets over the shortest path as long as there is no failure among the links in the shortest path.

4. The method according to claim 3, wherein designating another of the paths as the backup path comprises verifying that the backup path does not overlap the shortest path.

5. The method according to claim 1, wherein finding the shortest paths and the backup paths comprises:

placing the nodes of the network in a queue;

in the single pass, removing each node from the queue in succession and searching outgoing edges of the node; and terminating the greedy search algorithm when the queue is empty.

6. The method according to claim 1, wherein routing the packets comprises conveying traffic from the source node to the given destination node over both the shortest path and the backup path so as to balance a load of the traffic between the shortest path and the backup path.

7. Apparatus comprising:

a routing engine, which is configured to:

simultaneously compute a shortest path and a backup path through a network between a source node, the network having a plurality of nodes, in a single pass of a greedy search algorithm over the plurality of nodes of the network;

compute the shortest path and the backup path by:

computing respective path costs for each of a plurality of candidate paths between the source node and the destination node based on respective link costs of one or more links within each candidate path;

selecting as the shortest path the candidate path having a lowest computed path cost;

selecting as the backup path the candidate path having a lowest computed path cost of the candidate paths that does not overlap with the shortest path, including comparing a potential backup path to the shortest path and determining that the potential backup path overlaps with the shortest path, and in response, discarding the potential backup path as a possible backup path;

verify that the backup paths is loop-free and will not lead to a micro-loop in response to a failure of a link in the network; and a switch, which is coupled to route packets through the network using at least one path selected from among the shortest path and the backup path.

8. The apparatus according to claim 7, wherein the switch is configured to transmit the packets over the shortest path as long as there is no failure among the links in the shortest path.

9. The apparatus according to claim 7, wherein the routing engine is configured to verify that the backup path does not overlap the shortest path.

10. A computer software product, comprising a non-transitory computer-readable medium in which program instructions are stored, which instructions, when read by a computer, cause the computer to simultaneously compute a shortest path and a backup path through a network between a source node and a destination node, the network having a plurality of nodes, in a single pass of a greedy search algorithm over the plurality of nodes of the network, wherein the shortest path and the backup path are computed by:

computing respective path costs for each of a plurality of candidate paths between the source node and the destination node based on respective link costs of one or more links within each candidate path;

selecting as the shortest path the candidate path having a lowest computed path cost;

selecting as the backup path the candidate path having a lowest computed path cost of the candidate paths that does not overlap with the shortest path, including comparing a potential backup path to the shortest path and determining that the potential backup path overlaps with the shortest path, and in response, discarding the potential backup path as a possible backup path.

* * * * *

UNITED STATES PATENT AND TRADEMARK OFFICE
CERTIFICATE OF CORRECTION

| | | |
|---|---|---|
| PATENT NO. | : 8,243,604 B2 | Page 1 of 1 |
| APPLICATION NO. | : 12/074505 | |
| DATED | : August 14, 2012 | |
| INVENTOR(S) | : Anurag Kothari et al. | |

It is certified that error appears in the above-identified patent and that said Letters Patent is hereby corrected as shown below:

Title Page, Item (54) delete "ALTERATIVE" and insert --ALTERNATIVE--.

Signed and Sealed this

Thirteenth Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,243,604 B2 | Page 1 of 1 |
| APPLICATION NO. | : 12/074505 | |
| DATED | : August 14, 2012 | |
| INVENTOR(S) | : Anurag Kothari et al. | |

It is certified that error appears in the above-identified patent and that said Letters Patent is hereby corrected as shown below:

Title Page, Item (54) and at Column 1, line 1, Title: delete "ALTERATIVE" and insert
--ALTERNATIVE--.

This certificate supersedes the Certificate of Correction issued November 13, 2012.

Signed and Sealed this
Eleventh Day of December, 2012

David J. Kappos
*Director of the United States Patent and Trademark Office*